(12) United States Patent
Sampsell et al.

(10) Patent No.: US 8,373,821 B2
(45) Date of Patent: Feb. 12, 2013

(54) DUAL FILM LIGHT GUIDE FOR ILLUMINATING DISPLAYS

(75) Inventors: Jeffrey B. Sampsell, Pueblo West, CO (US); Russell W. Gruhlke, Santa Clara, CA (US); Mark Mienko, San Jose, CA (US); Gang Xu, Cupertino, CA (US); Ion Bita, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 169 days.

(21) Appl. No.: 12/795,542

(22) Filed: Jun. 7, 2010

(65) Prior Publication Data

US 2010/0309687 A1   Dec. 9, 2010

Related U.S. Application Data

(63) Continuation of application No. 11/742,299, filed on Apr. 30, 2007, now Pat. No. 7,733,439.

(51) Int. Cl.
*G02F 1/1335* (2006.01)
(52) U.S. Cl. .......................................... 349/62; 349/67
(58) Field of Classification Search .................... 349/62, 349/67
See application file for complete search history.

(56) References Cited

U.S. PATENT DOCUMENTS

| | | | |
|---|---|---|---|
| 4,375,312 A * | 3/1983 | Tangonan | 385/132 |
| 5,221,982 A | 6/1993 | Faris | |
| 5,592,332 A * | 1/1997 | Nishio et al. | 359/619 |
| 5,712,694 A | 1/1998 | Taira et al. | |
| 5,914,760 A | 6/1999 | Daiku | |
| 6,123,431 A | 9/2000 | Teragaki | |
| 6,259,854 B1 | 7/2001 | Shinji et al. | |
| 6,379,017 B2 | 4/2002 | Nakabayashi et al. | |
| 6,407,785 B1 | 6/2002 | Yamazaki | |
| 6,512,626 B1 * | 1/2003 | Schmidt | 359/296 |
| 6,592,234 B2 * | 7/2003 | Epstein et al. | 362/603 |
| 6,657,683 B2 * | 12/2003 | Richard | 349/63 |
| 6,667,782 B1 | 12/2003 | Taira et al. | |
| 6,685,342 B2 | 2/2004 | Terada | |
| 6,747,801 B2 | 6/2004 | Umemoto | |

(Continued)

FOREIGN PATENT DOCUMENTS

| | | |
|---|---|---|
| EP | 0 539 099 | 4/1993 |
| EP | 0 621 500 | 10/1994 |

(Continued)

OTHER PUBLICATIONS

Official Communication in European Application No. 08 153 436.4, dated Feb. 18, 2011.

(Continued)

*Primary Examiner* — K. Cyrus Kianni
(74) *Attorney, Agent, or Firm* — Knobbe, Martens, Olson & Bear LLP

(57) ABSTRACT

A front light guide panel including a plurality of embedded surface features is provided. The front light panel is configured to deliver uniform illumination from an artificial light source disposed at one side of the font light panel to an array of display elements located behind the front light guide while allowing for the option of illumination from ambient lighting transmitted through the light guide panel. The surface embedded surface relief features create air pockets within the light guide panel. Light incident on the side surface of the light guide propagates though the light guide until it strikes an air/light material guide interface at one on the air pockets. The light is then turned by total internal reflection through a large angle such that it exits an output face disposed in front of the array of display elements.

27 Claims, 17 Drawing Sheets

U.S. PATENT DOCUMENTS

| | | | |
|---|---|---|---|
| 6,778,746 B2 | 8/2004 | Charlton | |
| 6,819,380 B2 | 11/2004 | Wen et al. | |
| 6,883,924 B2 | 4/2005 | Maeda et al. | |
| 6,891,530 B2 | 5/2005 | Umemoto | |
| 6,966,685 B2 | 11/2005 | Li et al. | |
| 7,010,212 B2 | 3/2006 | Emmons et al. | |
| 7,133,022 B2 | 11/2006 | Grabert | |
| 7,186,014 B2 | 3/2007 | Shimura | |
| 7,218,812 B2 | 5/2007 | Maxwell | |
| 7,278,774 B2 | 10/2007 | Chang | |
| 7,327,510 B2 | 2/2008 | Cummings et al. | |
| 7,360,939 B2 | 4/2008 | Sugiura | |
| 7,452,120 B2 | 11/2008 | Lee et al. | |
| 7,543,974 B2 | 6/2009 | Bourdelais et al. | |
| 7,706,050 B2 | 4/2010 | Sampsell | |
| 7,733,439 B2 | 6/2010 | Sampsell | |
| 7,750,886 B2 | 7/2010 | Sampsell | |
| 7,766,531 B2 | 8/2010 | Anderson et al. | |
| 7,864,395 B2 | 1/2011 | Chui | |
| 2002/0048444 A1 | 4/2002 | Sung et al. | |
| 2003/0034445 A1 | 2/2003 | Boyd et al. | |
| 2003/0086030 A1 | 5/2003 | Taniguchi | |
| 2003/0123245 A1 | 7/2003 | Parker | |
| 2003/0165067 A1 | 9/2003 | Imamura | |
| 2003/0184989 A1 | 10/2003 | Matsumoto et al. | |
| 2003/0210222 A1 | 11/2003 | Ogiwara et al. | |
| 2004/0135494 A1 | 7/2004 | Miyatake | |
| 2004/0188599 A1 | 9/2004 | Viktorovitch | |
| 2004/0228109 A1 | 11/2004 | Leu | |
| 2004/0228112 A1* | 11/2004 | Takata | 362/31 |
| 2005/0002175 A1 | 1/2005 | Matsui et al. | |
| 2005/0018103 A1* | 1/2005 | Lubart et al. | 349/61 |
| 2005/0024890 A1 | 2/2005 | Yamamoto | |
| 2005/0046011 A1* | 3/2005 | Chen et al. | 257/705 |
| 2005/0185416 A1* | 8/2005 | Lee et al. | 362/551 |
| 2005/0231981 A1 | 10/2005 | Hoelen et al. | |
| 2005/0270798 A1 | 12/2005 | Lee et al. | |
| 2005/0271325 A1 | 12/2005 | Anderson | |
| 2006/0002675 A1 | 1/2006 | Choi | |
| 2006/0110090 A1 | 5/2006 | Ellwood | |
| 2006/0187676 A1 | 8/2006 | Ishikura | |
| 2007/0097694 A1 | 5/2007 | Faase | |
| 2007/0133226 A1 | 6/2007 | Mi | |
| 2007/0147087 A1 | 6/2007 | Parker | |
| 2007/0187852 A1 | 8/2007 | Parker et al. | |
| 2007/0279727 A1 | 12/2007 | Gandhi | |
| 2007/0292091 A1* | 12/2007 | Fujii et al. | 385/129 |
| 2008/0079870 A1 | 4/2008 | Kazuhiro et al. | |
| 2008/0089092 A1 | 4/2008 | Lee et al. | |
| 2008/0090025 A1 | 4/2008 | Freking | |
| 2008/0094853 A1 | 4/2008 | Kim | |
| 2008/0232135 A1 | 9/2008 | Kinder | |
| 2008/0285307 A1 | 11/2008 | Aylward | |
| 2009/0015753 A1 | 1/2009 | Ye | |
| 2009/0126777 A1 | 5/2009 | Khazeni et al. | |
| 2009/0135469 A1* | 5/2009 | Lee et al. | 359/296 |
| 2009/0296193 A1 | 12/2009 | Bita et al. | |
| 2010/0039832 A1 | 2/2010 | Ahlgren et al. | |
| 2010/0051089 A1 | 3/2010 | Khazeni | |
| 2010/0053148 A1 | 3/2010 | Khazeni | |
| 2010/0177533 A1 | 7/2010 | Griffiths | |
| 2010/0231510 A1 | 9/2010 | Sampsell et al. | |
| 2010/0302218 A1 | 12/2010 | Bita | |
| 2010/0302616 A1 | 12/2010 | Bita | |
| 2010/0302802 A1 | 12/2010 | Bita | |
| 2012/0047715 A1 | 3/2012 | Chui et al. | |

FOREIGN PATENT DOCUMENTS

| | | |
|---|---|---|
| EP | 1 116 987 | 7/2001 |
| EP | 1 122 586 | 8/2001 |
| EP | 1 437 610 | 7/2004 |
| EP | 1 762 778 A | 3/2007 |
| EP | 1 975 651 | 10/2008 |
| EP | 1 988 332 | 11/2008 |
| EP | 1 988 333 | 11/2008 |
| GB | 2 315 356 | 1/1998 |
| JP | 09 171111 | 6/1997 |
| JP | 10-261309 | 9/1998 |
| JP | 11 160699 | 6/1999 |
| JP | 11 211999 | 8/1999 |
| JP | 2002 174732 | 6/2002 |
| JP | 2002 174780 | 6/2002 |
| JP | 2002 196152 | 7/2002 |
| JP | 2003 057653 | 2/2003 |
| JP | 2003 186008 | 7/2003 |
| JP | 2008 103110 | 5/2008 |
| TW | 567388 | 12/2003 |
| WO | WO 99/64785 A | 12/1999 |
| WO | WO 01/59362 | 8/2001 |
| WO | WO 2008/038754 | 4/2008 |
| WO | WO 2008/045207 | 4/2008 |
| WO | WO 2008/122915 | 10/2008 |
| WO | WO 2008/137299 | 11/2008 |
| WO | WO 2009/011922 A1 | 1/2009 |
| WO | WO 2009/154957 | 12/2009 |

OTHER PUBLICATIONS

Official Communication in European Application No. 08 153 770.6, dated Feb. 18, 2011.
Official Communication in Chinese Application No. 200880014256.0, dated May 24, 2011.
Official Communication in Chinese Application No. 200880014256.0, dated Nov. 17, 2011.
Anonymously, (May 15, 2006). "Spreaders in light-guide optics", IP.com number: IPCOMO0013631,4.
Di Feng, et al. "Novel integrated light-guide plates for liquid crystal display backlight", Journal of optics A: Pure and Applied optics, 7 (2005) 111-117.
Yan, et al., "Edge-Lighting Light Guide Plate Based on Micro-Prism for Liquid Crystal Display," Journal of Display Technology, vol. 5, No. 9, pp. 355-357, Sep. 2009.
Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.
International Search Report and Written Opinion in PCT/US2009/045186 dated Jan. 29, 2010.
International Preliminary Report on Patentability in PCT/US2009/045186 dated Sep. 24, 2010.
Office Action in U.S. Appl. No. 12/474,245, dated May 7, 2010.
Amendment in U.S. Appl. No. 12/474,245, dated Aug. 9, 2010.
Office Action in U.S. Appl. No. 12/474,245, dated Oct. 14, 2010.
Request for Continued Examination, Amendment, and Information Disclosure Statement in U.S. Appl. No. 12/474,245, dated Dec. 15, 2010.
Office Action in U.S. Appl. No. 11/742,299, dated Apr. 14, 2008.
Response to Office Action in U.S. Appl. No. 11/742,299, filed Jul. 14, 2008.
Final Office Action in U.S. Appl. No. 11/742,299, dated Oct. 20, 2008.
Request for Continued Examination and Response to Final Office Action in U.S. Appl. No. 11/742,299, filed Mar. 20, 2009.
Notice of Allowance in U.S. Appl. No. 11/742,299, dated Jun. 5, 2009.
Request for Continued Examination and Information Disclosure Statement in U.S. Appl. No. 11/742,299, filed Sep. 2, 2009.
Notice of Allowance in U.S. Appl. No. 11/742,299, dated Dec. 16, 2009.
Amendment and Reasons for Allowance in U.S. Appl. No. 11/742,299, dated Mar. 15, 2010.
Response to Amendment in U.S. Appl. No. 11/742,299, dated Apr. 2, 2010.
Office Action in U.S. Appl. No. 12/725,407, dated Jun. 27, 2012.
Official Communication in Japanese Application No. 2010-506419, dated May 15, 2012.
Official Communication in Russian Application No. 2009140154/28, dated May 11, 2012.
Official Communication in Japanese Application No. 2010-506419, dated Oct. 9, 2012.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

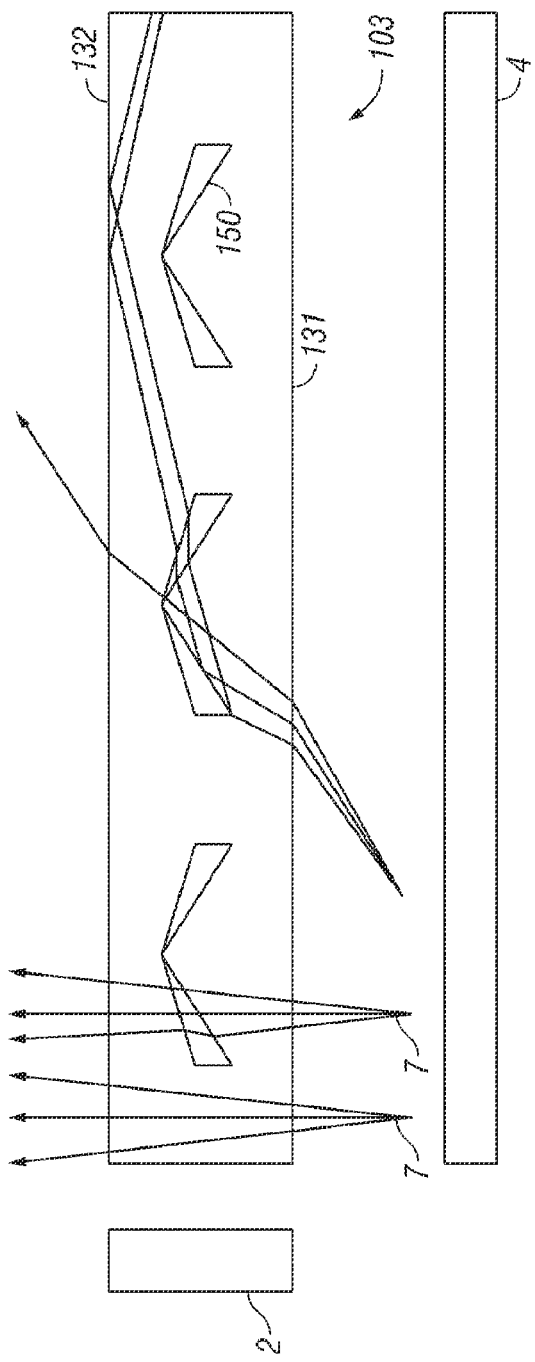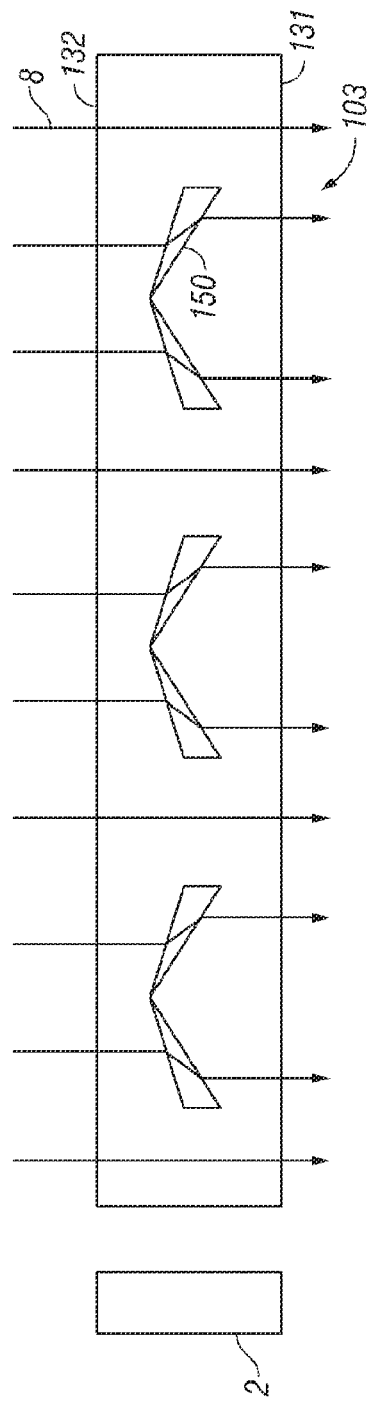
FIG. 11
FIG. 12

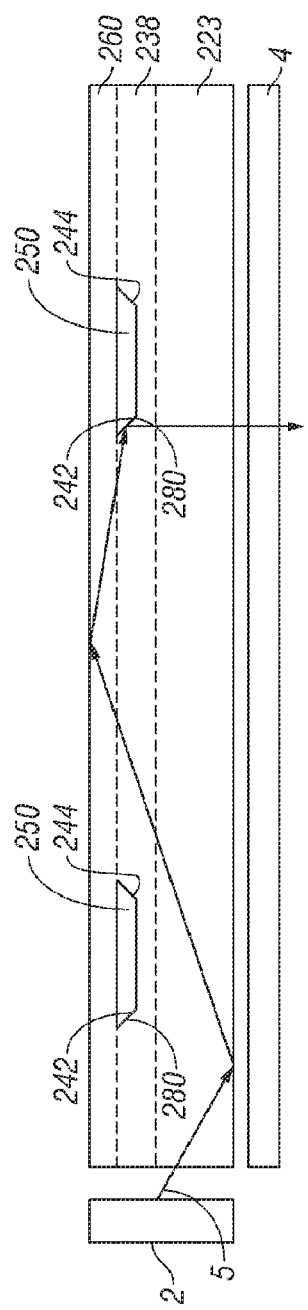
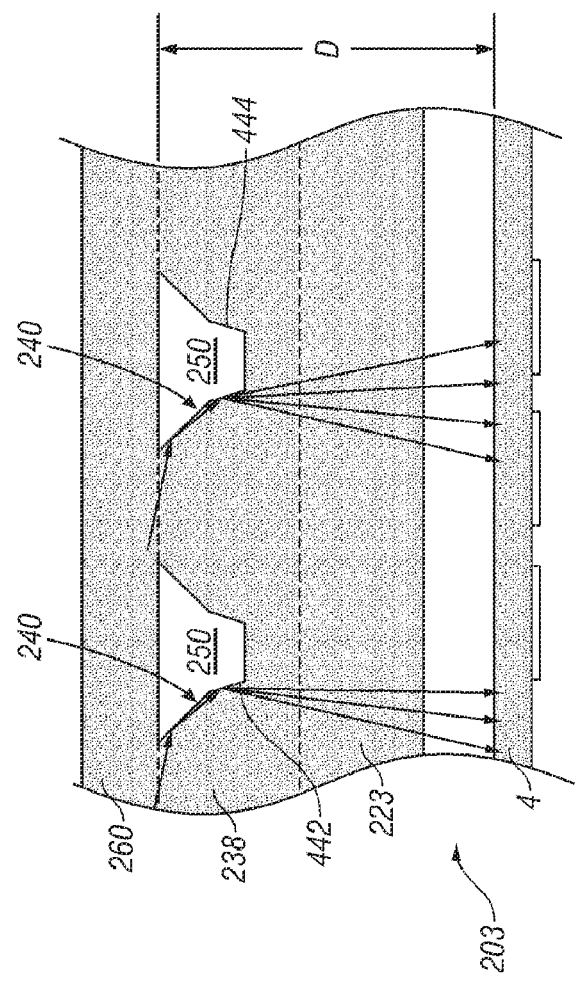

DUAL FILM LIGHT GUIDE FOR ILLUMINATING DISPLAYS

RELATED APPLICATIONS

This application is a continuation of U.S. patent application Ser. No. 11/742,299, filed Apr. 30, 2007, entitled DUAL FILM LIGHT GUIDE FOR ILLUMINATING DISPLAYS, which is hereby incorporated herein by reference in its entirety.

BACKGROUND

1. Field of the Invention

The present invention relates generally to frontlit displays, such as LCD displays, and particularly to dual film configurations of light guides for frontlit displays.

2. Description of the Related Technology

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

Various embodiments described herein comprise light guides for distributing light across an array of display elements. The light guide may include surface relief features to turn light propagating in a light guide onto the array of display elements. The surface relief features may comprise facets that reflect light. To protect these facets, the facets are embedded within the light guide. Other embodiments are also disclosed.

One embodiment of the invention comprises a light guide comprising an upper portion having top and bottom surfaces and a lower portion having top and bottom surfaces. The bottom surface of the upper portion is contoured. The top surface of the lower portion is also contoured. The upper portion is disposed over the lower portion such that the contoured bottom surface of the upper portion and the contoured top surface of the lower portion form cavities between the upper portion and the lower portion.

Another embodiment of the invention comprises a light guide comprising a cover layer having top and bottom surfaces, a film having top and bottom surfaces wherein the top surface of the film is contoured, and a light guide plate having top and bottom surfaces. The cover layer is disposed over the film such that the bottom surface of the cover layer and the top contoured surface of the film form cavities between the cover layer and the film. The film is disposed between the cover layer and the light guide plate.

Another embodiment of the invention comprises a light guide comprising a cover layer having a planar surface, a film having first and second surfaces, and a light guide plate having top and bottom planar surfaces. The first surface of the film comprises a plurality of concave surface relief features and the second surface of the film is planar. The film is disposed on the light guide plate such that the planar second surface is adjacent the light guide plate and the concave surface relief features of said first surface face away from the light guide plate. The cover layer is disposed adjacent the film such that the planar surface of the cover layer and the concave surface features of the film form cavities between the cover layer and the film.

Another embodiment of the invention comprises a light guide comprising a first means for guiding light and a second mean for guiding light. The first and second light guiding means have respective means for mating the first and second light guiding means together. The mating means for both the first and second light guiding means is contoured such that when the first and second light guiding means are mated together. The means for reflecting light are formed therebetween.

Another embodiment of the invention comprises a light guide comprising a first means for guiding light, a second means for guiding light, and means for covering the second light guiding mean. The covering means is disposed such that the second light guiding means is between the covering means and the first light guiding means. The second light guiding means and the covering means have respective means for mating the second light guiding means and the covering means together. The mating means for the second light guiding means is contoured such that when the second light guiding means and the covering means are mated together, means for reflecting light are formed therebetween.

BRIEF DESCRIPTION OF THE DRAWINGS

FIG. 11 depicts light rays from the display panel propagating through the light guide of FIG. 9.

FIG. 12 depicts light rays from ambient light propagating through the light guide to the display panel.

FIG. 18 depicts an alternative embodiment of a front light guide having embedded surface features with a reflective coating.

FIG. 19 depicts a detailed view of a portion of an alternative embodiment of a front light guide showing multifaceted embedded surface features.

DETAILED DESCRIPTION OF CERTAIN PREFERRED EMBODIMENTS

The following detailed description is directed to certain specific embodiments of the invention. However, the invention can be embodied in a multitude of different ways. In this description, reference is made to the drawings wherein like parts are designated with like numerals throughout.

In various embodiments described herein, an edge illuminated front light guide panel includes a plurality of embedded surface features. The embedded surface relief features may form fillable gaps or cavities such as air pockets within the light guide panel. Light injected into an edge of the light guide propagates though the light guide until it strikes an air/light guide material interface at one on the air pockets. The light is then turned by total internal reflection through a large angle such that it exits an output face disposed in front of a display panel. To create air pockets, a pair of guide portions have contoured surfaces that are contacted to each other. Other embodiments are also disclosed herein.

As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry).

The display device, such as, e.g., interferometric modulating MEMS devices, LCDs, etc., may include a light source that is configured to light an array of display elements to an appropriate level for viewing. In combination with the light source, a light guide may be coupled to the array of display elements proximate the light source to distribute light across the array of display elements. Light guides may be positioned in various orientations with respect to the display elements, such as behind the display elements, e.g., a backlight, or in front of the display elements, e.g., a frontlight. In the systems and methods described herein, a front light guide panel is disposed in front of the array of display elements to deliver uniform illumination from an artificial light source to the array of display elements while allowing for the option of illumination from ambient lighting via a reflective layer in the display elements.

Figure 1:
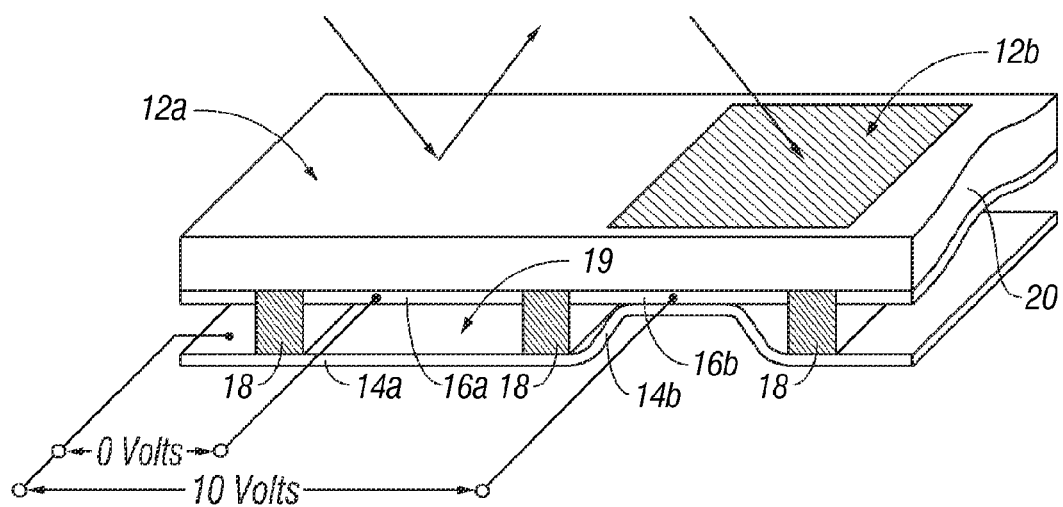
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
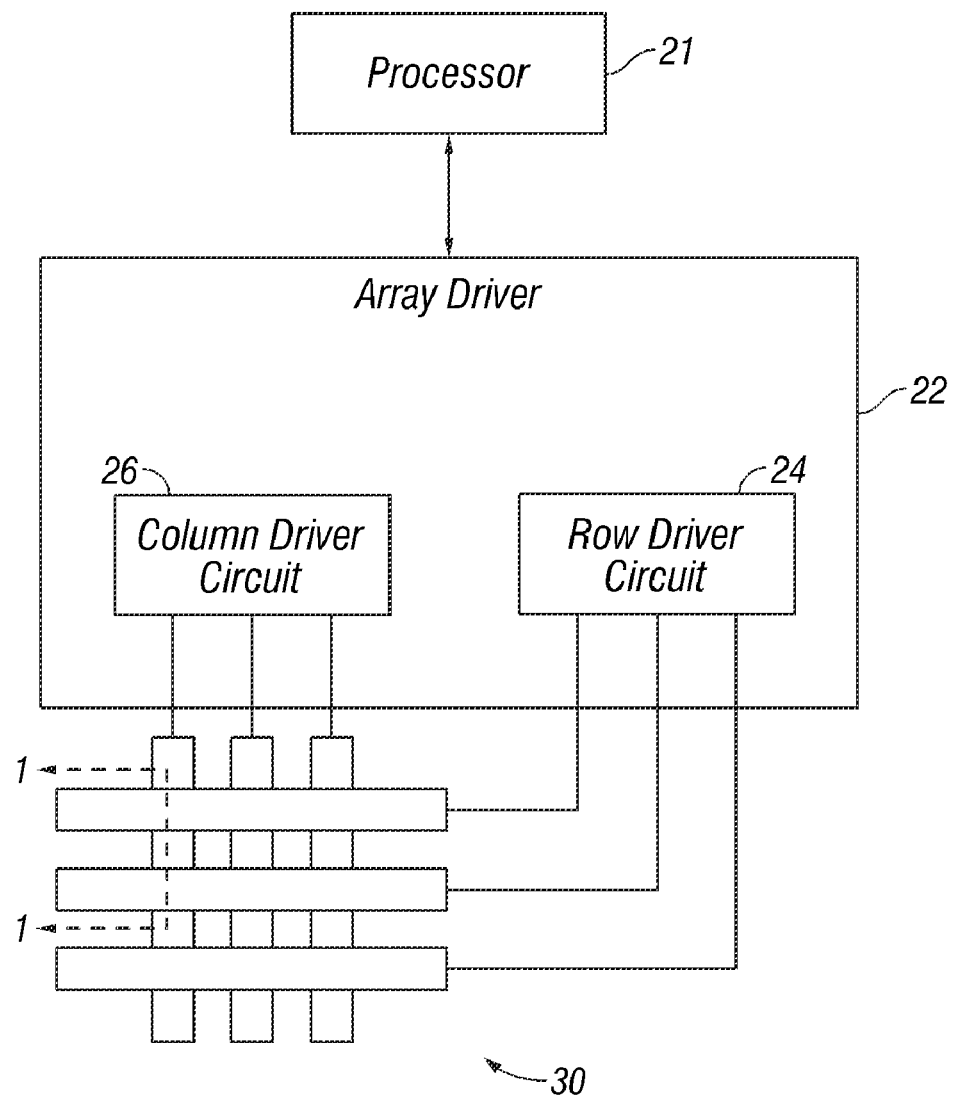
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
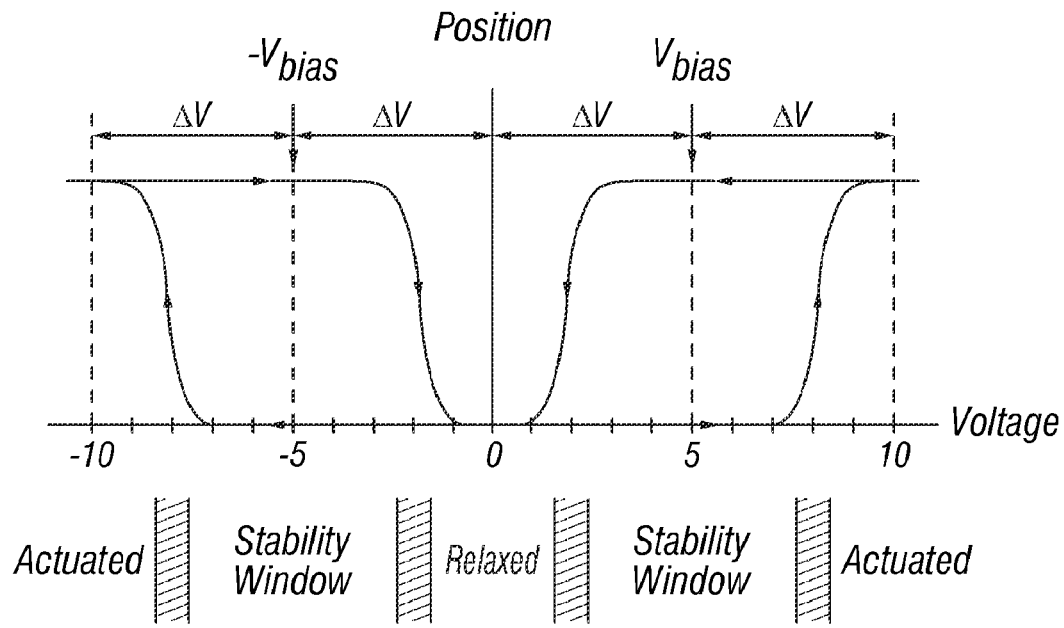
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
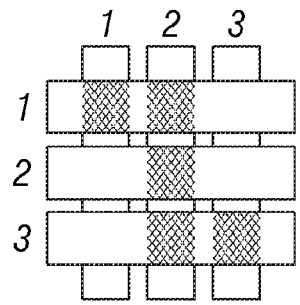
FIG. 5A illustrates one exemplary frame of display data in the 3×3 interferometric modulator display of FIG. 2.
Figure 5B:
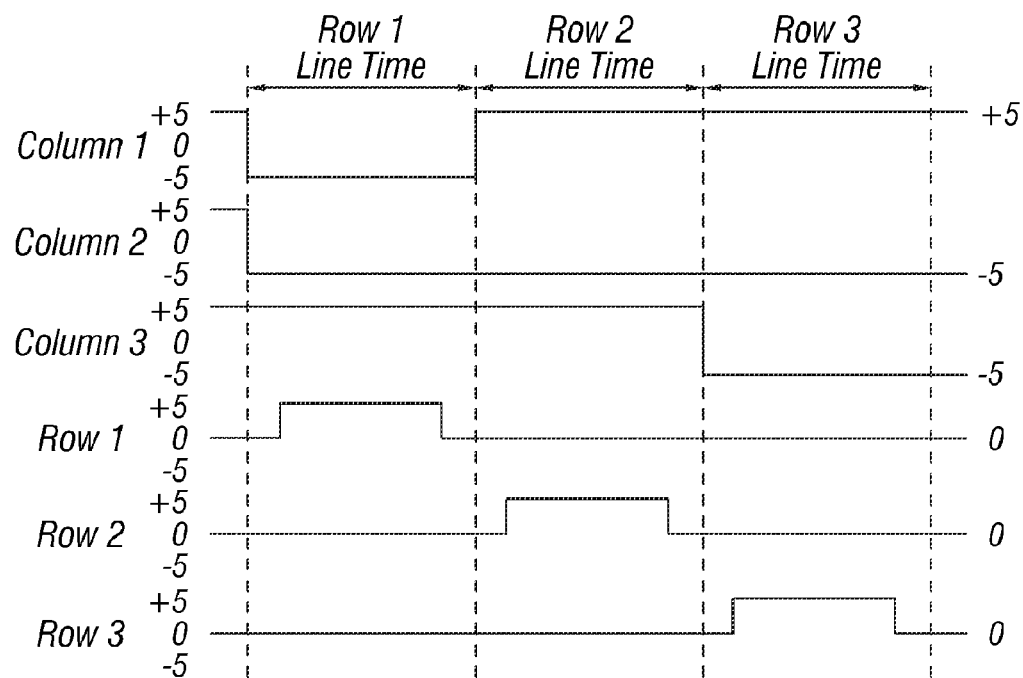
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
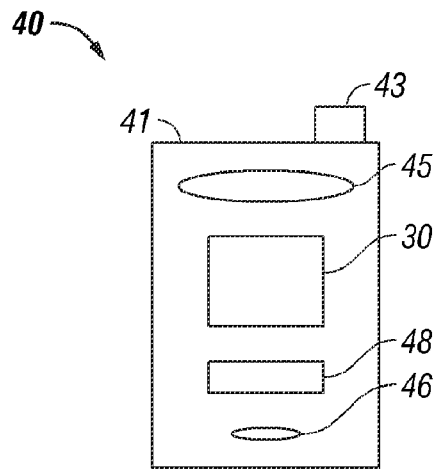
FIGS. 6A and 6B are system block diagrams illustrating an embodiment of a visual display device comprising a plurality of interferometric modulators.
Figure 6B:
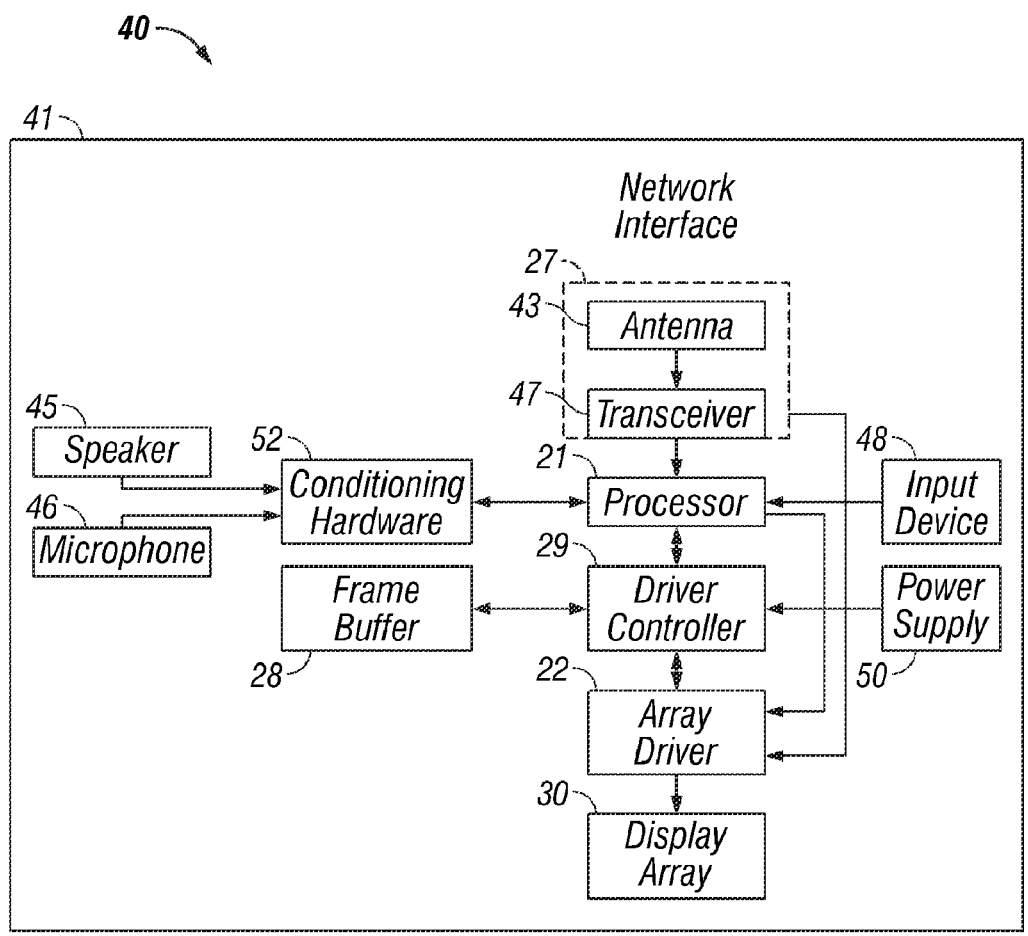

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
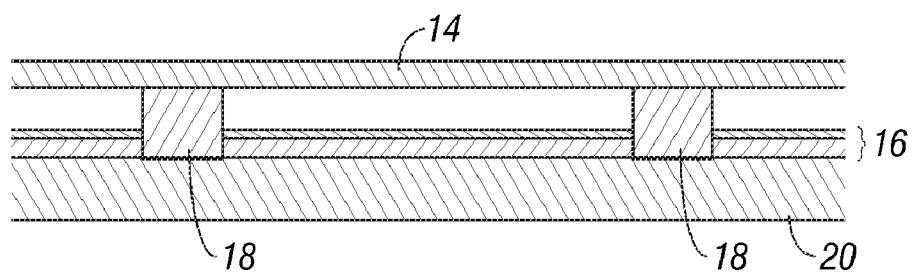
FIG. 7A is a cross section of the device of FIG. 1.
Figure 7B:
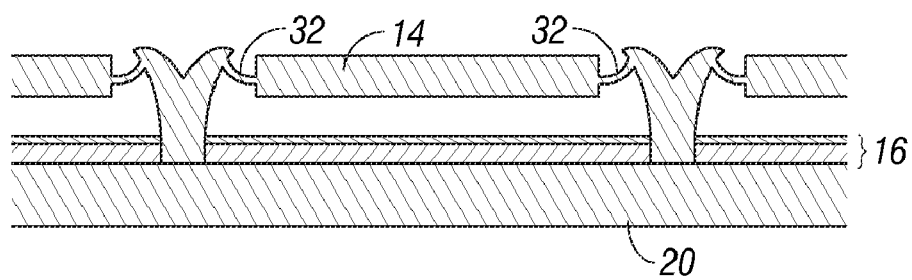
FIG. 7B is a cross section of an alternative embodiment of an interferometric modulator.
Figure 7C:
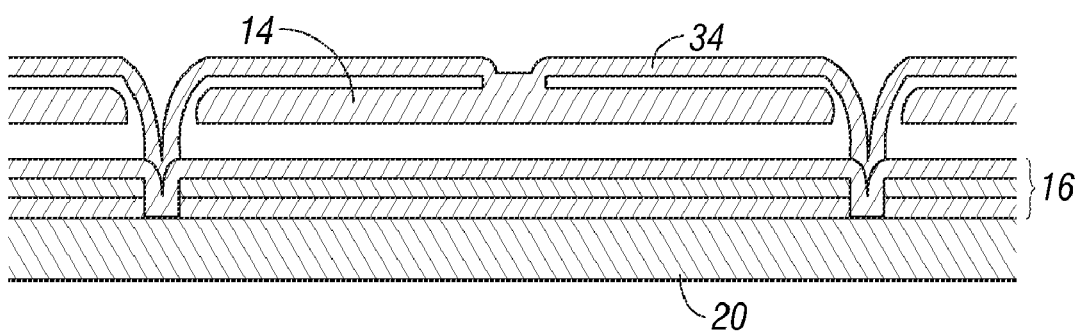
FIG. 7C is a cross section of another alternative embodiment of an interferometric modulator.
Figure 7D:
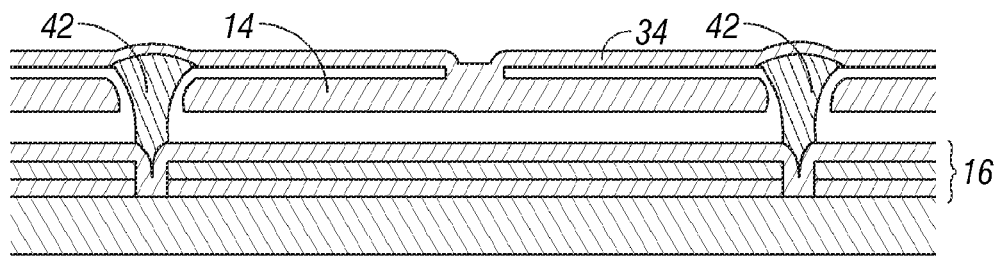
FIG. 7D is a cross section of yet another alternative embodiment of an interferometric modulator.
Figure 7E:
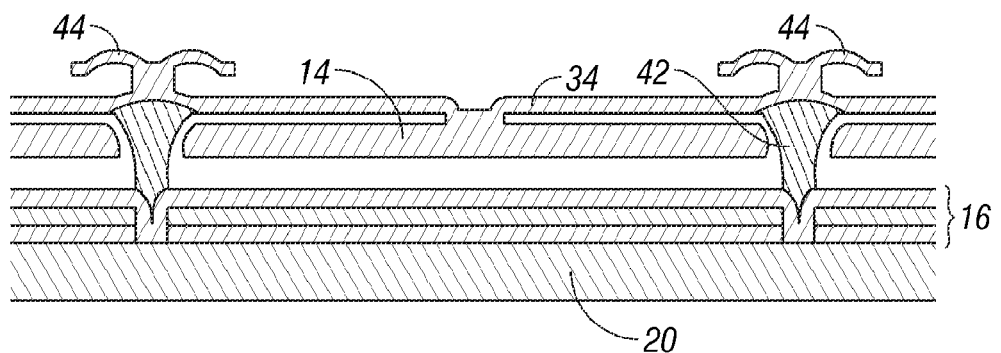
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In display technology, artificial lighting can be used to make the display visible. To do this, light from a source such as a fluorescent tube or LED is captured into a thin slab shaped light guide and is delivered to the display. The illumination can be provided by "backlighting" or "frontlighting."

Flat panel displays are typically "backlit" by light guide slabs (often referred to as "backlights") that redirect light from a linear light source to transmit uniform illumination to the rear surface of the display panel. The light injected along an edge of the light guide panel is guided within the light guide panel and extractor features located on a rear or front surface of the light guide panel can be used to disrupt the propagation of the light within the light guide panel and cause the light to be uniformly ejected across the front surface of the panel toward the display.

Alternatively, flat panel reflective displays may be "front-lit" by a front light guide that delivers uniform illumination from the viewing side of the display panel. Such displays may also reflect ambient light, thereby increasing their brightness in well-lit ambient light conditions. The frontlight may be utilized only in low-light ambient conditions in some configurations.

Figure 8:
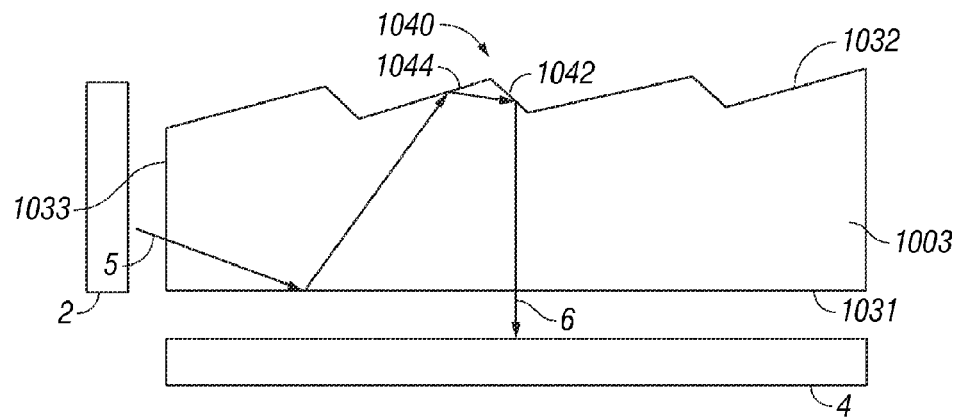
FIG. 8 depicts a front light guide unit for use in a flat panel display comprising a linear light source and a front light guide panel.

In a frontlit system, as shown in FIG. 8, light from a linear source 2 such as a fluorescent tube, LED or LED array, or a light bar illuminated by an LED is injected into a thin slab shaped light guide panel 1003 located in front of the display panel 4.

The light 5 injected into the light guide is guided along the length of the light guide 1003. In order to provide uniform illumination to the display panel, the light 5 is turned through a large angle, approximately ninety degrees, such that it propagates through the thickness of the light guide 1003 and escapes through the output face 1031. The light turning may be accomplished via a surface relief structure containing a plurality of turning features.

As discussed above with respect to FIG. 8, light beams 5 entering the light-input surface 1033 are propagated through the front light guide 3 toward the opposite side face of the light guide 1003 by total internal reflection. The viewing face 1032 further contains a plurality of light turning structures such as prismatic microstructures 1040 arranged in a pattern along the width of the viewing face 1032. The prismatic microstructures 1040 may comprise two or more turning facets 1042 and 1044 angled with respect to one another for reflecting the light at the facet/air interface, causing the light to be turned through a large angle. The plurality of pairs of adjacent facets 1042 and 1044 may comprise, for example, one shallow, long facet and a much shorter but more steeply inclined facet. If light strikes the first, shallow facet and then the second steeper facet sequentially as shown in FIG. 8, total internal reflection occurs at both facet/air interfaces and the light turns through large angles. The light following this path is then extracted out of the light guide through the output face towards the adjacent display panel. Thus, the light beams 5 encountering one of these structures 1040 are diffusely or specularly reflected, and largely emitted through the output face 1031. Multiple internal reflections enhance mixing of light within the light guide plate 3 which assists in providing uniformity in light output across the light output face 1031.

These prismatic surface relief features are either fabricated into the surface of the light guide, such as by embossing, injection molding casting or other techniques, or are fabricated into a thin film that is, in turn, attached to the surface of a planar light guide. In certain designs, the prismatic surface relief structure is located on the top surface of the light guide, i.e. the exposed surface opposite the light output face. As a result, if not protected from ambient conditions, the turning facets are vulnerable to contamination from dirt, water or other contaminants. The presence of, for example, dirt may destroy total internal reflection at the facet interface and reduces the light turning performance of the prismatic microstructure. Dust or particle contaminates trapped in the valleys of such prismatic microstructure will also scatter light directly into the viewers eye and therefore reduce display contrast.

Thus, it is advantageous to protect the prismatic surface relief structure during both the manufacture and the lifetime use of the display. This is a major problem and has restricted the widespread application of this technology. Clean room facilities may be used to prevent surface relief contamination during manufacture; but this approach increases manufacturing costs. In addition, a sealed cover plate may be used to protect the prismatic surface during device use. However, this contributes to the thickness of the light guide and the complexity of manufacturing. Accordingly, other designs, which may yield performance enhancements, simplify manufacturing, and/or reduce cost, may be desirable.

Figure 9:
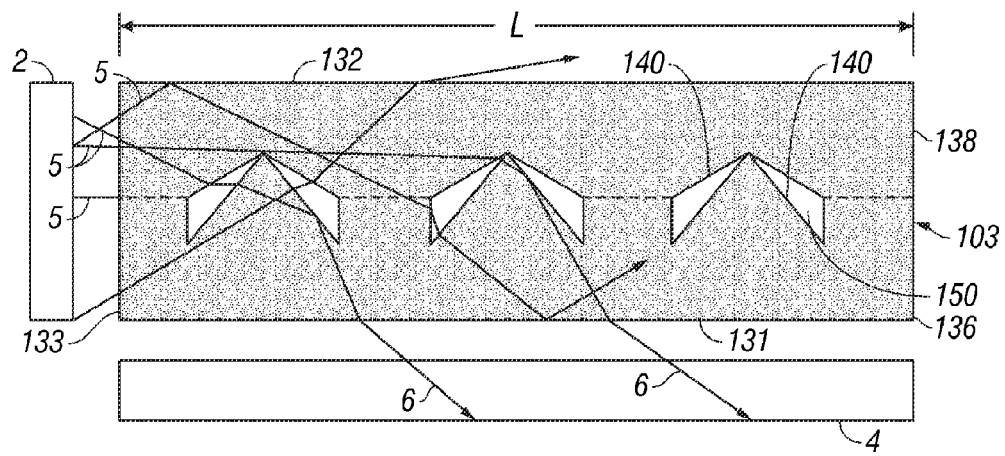
FIG. 9 depicts a frontlit display comprising a reflective display panel, a dual film front light guide panel having embedded surface features and a light source.

FIG. 9 shows an example front-lit display, comprising a linear light source 2 and a front light guide panel or plate 103 (LGP). This linear light source 2 may comprise, for example, a cold cathode fluorescent tube (CCFL) lamp, an LED, an OLED, a light bar illuminated by an LED or LED array, a fluorescent tube or any other suitable linear light source. This light source 2 is aligned parallel with an edge of the front light guide plate 103 such that light from the linear light source 2 is incident on a light-input surface 133 of the light guide plate 103.

The front light guide 103 comprises a substantially optically transmissive material capable of redirecting and uniformly redistributing light from the linear light source 2 over the planar surface of an output face. The light guide 103 comprises a light input surface 133, a light output face 131 perpendicular to the light input surface, and a viewing face 132 opposite the light output face 131.

The light 5 from the linear light source 2 enters the light input surface 133 of the light guide plate 103 and as will be explained in more detail below, propagates along the length L of the light guide plate 103 reflecting between the front and back faces 132 and 131 of the light guide plate 103 and is turned by features within the light guide plate 103 to exit the light guide plate 103 through the light output face 131 and propagate toward the display panel 4.

In certain embodiments, the front light guide 103 comprises a rectangular shaped plate or sheet with the output face 131 and viewing face 132 being parallel to each other. In one embodiment, the front light guide 103 may comprise a wedge shaped plate wherein the light output face 131 and viewing face 132 are angled with respect to one another. In another embodiment, portions of the light output face 131 and viewing face 132 are angled with respect to one another and other portions are parallel to one another. In another embodiment, the light output face 131 and viewing face 132 are not parallel to each other, for example the viewing face 132 may have a sawtooth pattern (not shown).

In certain embodiments, the front light guide may be comprised of an upper portion and a lower portion each having contoured surfaces which are joined together such that the facing contoured surfaces create a plurality of turning features embedded between the upper and lower portions. For example, as shown in FIG. 9, the front light guide 103 may be comprised of two polymer films 136 and 138 joined together such that the light turning features 140 of the light guide 103 reside on the two adjacent faces of the polymer films 136 and 138 and are thus embedded in the resulting light guide panel 103.

Figure 10:
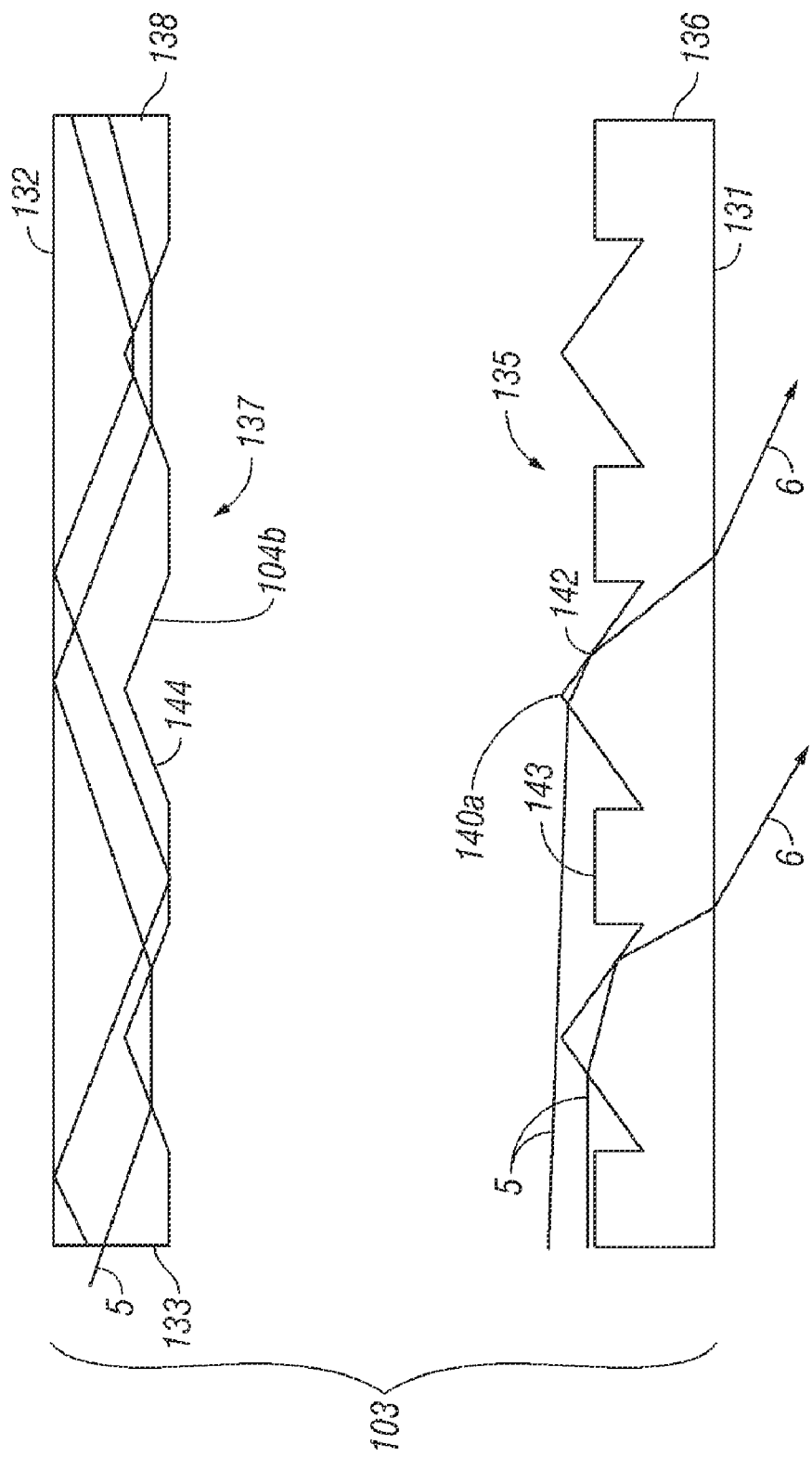
FIG. 10 depicts the top and bottom films of the dual film light guide of FIG. 9.

As shown in more detail in FIG. 10, the light guide 103 includes the bottom film 136 (positioned farther from the viewer) and the top film 138 (positioned closer to the viewer). The bottom film 136 has a flat planar surface that forms the output face 131 of the resulting light guide plate and an opposing structured surface 135 that includes a plurality of surface relief features 140a spaced apart across the width of the film 136. Likewise, the top film 138 comprises a flat planar surface that forms the viewing face 132 of the resulting light guide 103 and an opposing structured surface 137 that includes a plurality of surface relief features 140b spaced apart across the width of the film 138. A light guide plate 103 may be created by joining the two films 136 and 138 together with their structured sides 135 and 137 facing one another such that the surface features 140a and 104b become embedded in the resulting film 103 and are thereby protected from outside damage or contamination. In the illustrated embodiment, the films 136 and 138 are optically coupled such that when each of the structured faces 135 and 137 of the films 136 and 138 are aligned and joined together, the surface relief features 140a and 140b form a series of fillable gaps or cavities 150 (see FIG. 9) spaced apart across the length of the light guide plate 103. However, in alternative embodiments, the opposing surface features 140 a and b may not be equally spaced along the surfaces 135 and 137 of the top and bottom films 136 and 138 and may be instead intentionally offset, for example, to provide for different light turning effects along the length of the light guide plate.

In one embodiment, the top and bottom films 136 and 138 have the same index of refraction such that, when joined, they become optically one light guide, operating like one film, with no optical interface therebetween and a plurality of cavities embedded therein. In use, guided light striking an interface between one of the facets and the embedded air pocket will preferentially undergo total internal reflection at that interface and thereby be turned though a large angle, for example between 75°-90°. In certain embodiments, the cavities may be filled with a filler material to provide mechanical stability and strength to the light guide plate. The filler material may have a different index of refraction from the light guide material to ensure that total internal reflection at the facet/cavity interface still occurs.

Accordingly, the cavities may be open. As described above, these cavities may also be filled with material. The term cavity is used to describe either case, when the volume is open, e.g. filed with air or gas, and when the volume is filled with material such as an optically transmissive material having a different optical property, such as refractive index.

The shape and size of the surface features 140a and 140b, and thus the resulting cavities 150 (see FIG. 9), may also be chosen to interact extensively with guided light incident on the input face and to increase or maximize extraction efficiency, for example, to provide uniform distribution of light at a desired angle across the output face. Accordingly, the surface features 140a and 140b may comprise any suitable shape for causing light injected from the side, input face 133 that is generally parallel to the output face 131 to be turned over a large angle and ejected from the output face 131. At the same time the surface features 140a and 140b may be shaped to permit light incident on the viewing face 132 such as ambient light that is substantially normal to the viewing face 132 to be transmitted through the light guide plate 103 and the surface features relatively unaffected and ejected from the output face 131 at an angle substantially normal to the output face. For example, the surface features may comprise a plurality of repeating prismatic microstructures each comprising two adjacent, symmetrical facets. Alternatively, the surface features may comprise a plurality of repeating prismatic microstructures each comprising two adjacent facets having different angles of inclination with respect to the film. Other configurations are also possible.

In one embodiment, the surface features 140a and 140b are sufficiently small to be unobtrusive to the viewer. In certain embodiments, the surface features 140a and 140b may be identical across the length, L, of the films 136 and 138, for example repeating the same angular orientation, shape or dimensions as described above. Alternatively, the shape, angular orientation and/or size of the surface features 140a and b may vary across the length of the films 136 and 138.

In certain embodiments, the surface features 140a may be mirror opposites of the surface features 140b, alternatively, the surface features 140a may be complementary shapes relative to the surface features 140b, one fitting at least partially in the other. When joined together, the surface features 140a and 140b form opposing top and bottom films 136 and 138 may create a plurality of symmetrical cavities 150 embedded in between the two films. Alternatively, the surface features 140a and 140b from opposing top and bottom films 136 and 138 may create asymmetrical cavities embedded between the films. In certain embodiments, such asymmetrical cavities may be designed to reduce the length of the facet/air interface and thereby reduce the detrimental Fresnel reflections that occur when the light rays strike the interface. Because the cavities are created by the joining of surface features 140a and 140b, more complex turning features can be created. For example, re-entrant structures may be created where the re-entrant nature is not formed in either film, but rather is created when the surface features 140a and 140b of the top and bottom films 136 and 138 are joined.

For example, in the illustrated embodiment shown in detail in FIG. 10, the surface features 140a on the bottom film 136 comprise a plurality of alternating microprisms 142 spaced apart across the length of the structured surface 135 and separated by a plurality of planar spacers 143. The microprisms 142 are formed of adjacent facets angled with respect to each other such that light rays 5 incident on the tip of the microprisms 142 will enter the prism and subsequently be internally reflected at the microprism/air interface and thereby turned through a large angle to be ejected from the output face 131 of the light guide 103 as light rays 6. The surface features 140b on the top film 138 comprise a plurality of grooves 144 spaced apart across the length of the structured surface 137. The grooves 144 comprise adjacent angled surfaces, having angles with respect to one another such that total internal reflection (TIR) rays that are totally internally reflected across the length of the film 138, as well light rays with angles close to TIR, incident on the grooves 144 will be refracted straight across the width of the grooves 144. Thus, as shown in FIG. 9, when the films 136 and 138 are conjoined to form light guide plate 103, the surface features 140a and 140b cooperate to form embedded cavities 150, spaced apart along the length of the light guide plate 103. These cavities 150 create an air/light guide material interface at the surface of the microprisms 142 which causes the light traveling through the tip of the microprisms 142 to be turned through a large angle, thus redistributing and redirecting light rays incident 5 on the input face 133 to be ejected as light 6 through the output face 131 and toward the display 4.

In use, as shown in FIGS. 8, 10-11, when light rays 5 from the linear light source 2 are injected into the front light guide plate 103, the light rays 5 are propagated through the light guide plate 103 via total internal reflection (TIR), an optical phenomenon wherein light traveling from a medium with a higher refractive index, such as glass, to one with a lower refractive index, such as air, is incident on the medium boundary at an angle such that the light is reflected from the boundary. As these light rays are guided through the light guide plate, they eventually strike the facets of the microprisms 142 of the surface feature 140*a*. Because of the difference in index of refraction between the air and light guide material at the air/light guide material interface formed by the cavities 150, the light rays 5 are turned through a large angle and ejected from the light output face 131 of the light guide plate 103. The light rays 6 ejected from the light output face 131 of the light guide plate 103 propagate across an air gap and are incident on the display panel 4, for example an interferometric modulator display panel, wherein the rays are modulated and reflected back toward the light output face 131 of the light guide. As shown in FIG. 11, the modulated light rays 7 from the display panel 4 are incident on light output face 131 of the light guide plate 103. These light rays 7 are transmitted through the light guide plate 103 and exit from the viewing face 132 whereupon they may be seen by a viewer. Accordingly, in various embodiments, the surface features 140*a* and 140*b*, and thus cavities 150, are shaped such that light incident upon the light output face 131 at normal or near normal angles is transmitted through the light guide plate 103 and the cavities 150 without much disturbance or deviation.

As shown in FIG. 12, if the ambient light level is sufficiently high, additional illumination from the linear light source 2 may not be required to illuminate the display panel 4. Here, the ambient light rays 8 incident on the viewing face 132 at a normal or near normal angle are likewise propagated through the light guide plate 103 and cavities 150 without much disturbance. The ambient light rays 8 are then ejected from the light output face 131 and propagate across an air gap to the display 4 as described above. Thus, the light guide plate 103 provides the capability to interact extensively with the guided light incident on a light input face while at the same time only slightly disturbing non-guided light incident on the output and viewing faces. In addition, the light guide plate 103 provides protection for the light turning features from damage or contamination by embedding the surface features in between two films.

Figure 13:
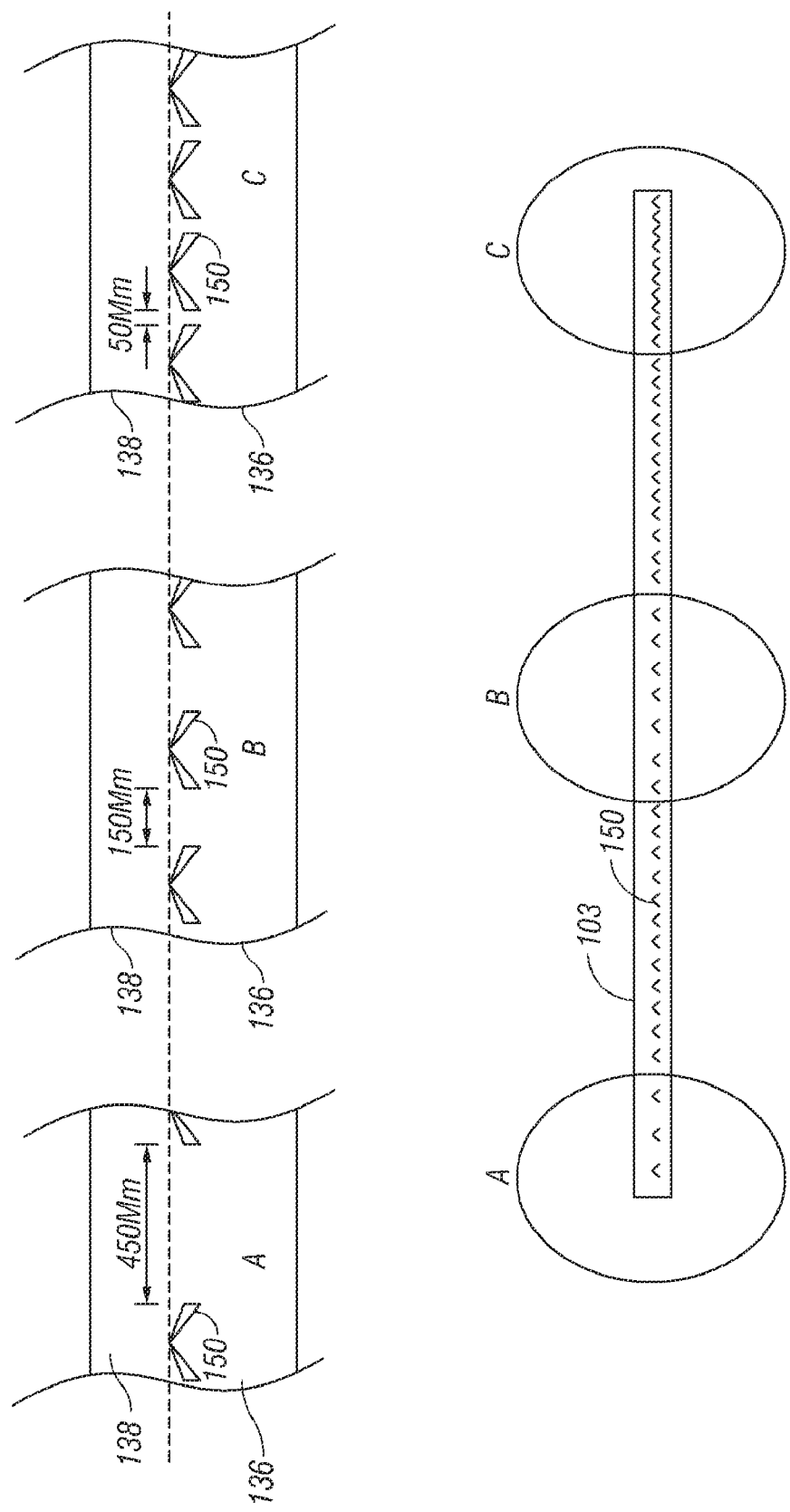
FIG. 13 depicts an alternative embodiment of a front light guide wherein the distance between surface features varies across the length of the light guide.

In certain embodiments, the size, shape spacing, or other characteristic of the surface features 140*a* and *b* may be varied across the length, L, of the light guide plate 103, for example to obtain uniform light extraction across the length of the light output face 131. As shown in FIG. 13, a particular light guide panel 103 (as illustrated in FIGS. 9-12) is shown with the distance between pairs of corresponding surface features 140*a* and 140*b* varying from 50 to 450 microns across the width of the light guide plate. For example, in the illustrated embodiment, the spacing between surface features 140*a* and 140*b* decreases with increasing distance from the light source 2. For example, in the region A of the light guide plate 103 closest to the light source 2, the spacing between pairs of surface features 140*a* and 140*b* is about 450 microns; in the middle region B the spacing between pairs of surface features 140*a* and 140*b* is about 150 microns; and in the farthest region C the spacing between pairs of surface features 140*a* and 140*b* is about 50 microns. The decrease in distance between the pairs of surface features 140*a* and 140*b* results in an increase in extraction efficiency in the regions of the light guide plate 103 furthest from the light source 2. This extraction efficiency balances out the decrease in light flux actually reaching father regions of the light guide 103 and results in a more uniform output across the surface of the light output face 131. Alternatively, as discussed above, the viewing face 132, of the light guide plate 103 may be angled with respect to the output face 131 to form a wedged shaped light guide plate 103 which also increases the extraction efficiency in the regions of light guide plate furthest from the light source 2.

The light guide 103 may be fabricated by imprinting films 136 and 138 with a designed surface relief, such as the microprisms 142 on bottom film 136 or the faceted grooves 144 on top film 136 depicted in FIG. 10. These surface relief features may be created by embossing, injection molding or any other suitable technique known in the art. Once the surface features have been molded on the top and bottom films, the films may be aligned and joined together to create the light guide plate 103. The films may be joined together, for example, by laminating with any suitable adhesive. Suitable adhesives may include pressure sensitive adhesives, heat cured adhesives, UV or electron beam cured adhesives or any other adhesives having suitable optical and mechanical properties. In some embodiments, when laminating the films, however, care must be taken not to fill the open cavities between the surface features with the adhesive material, thereby possibly destroying the light turning properties of the cavities. In some embodiments, the films are between about 70-80 microns thick, however the surface features are only between about 7 to 8 microns deep. Therefore, without due care, the laminating adhesive used to join the top and bottom films may ooze or seep into and fill the open cavities created by the surface features when pressure is applied to join the films. This result may be avoided by controlling the thickness of the laminating material applied between the top and bottom films to prevent excess adhesive. Alternatively, a photo-reactive adhesive may be used and may be cured by UV light so that excessive pressure on the two films is not required to join the two films. Alternatively, a thin metallic coating may be applied between the two films and then cured with RF energy. In certain embodiments, the laminating material may be applied before the films are imprinted with surface relief features. When the surface features are imprinted on each film, the laminating material will be removed from the surface features and thus when the two films are joined there will not be any excess material to seep into the open cavities. In certain embodiments, as described above, the open cavities may be filled with a filler material having a lower refractive index than the light guide material. This filler material may be added prior to laminating such that the filler material serves the added function of preventing any of the laminating material from seeping into and filling the cavities.

Figure 14:
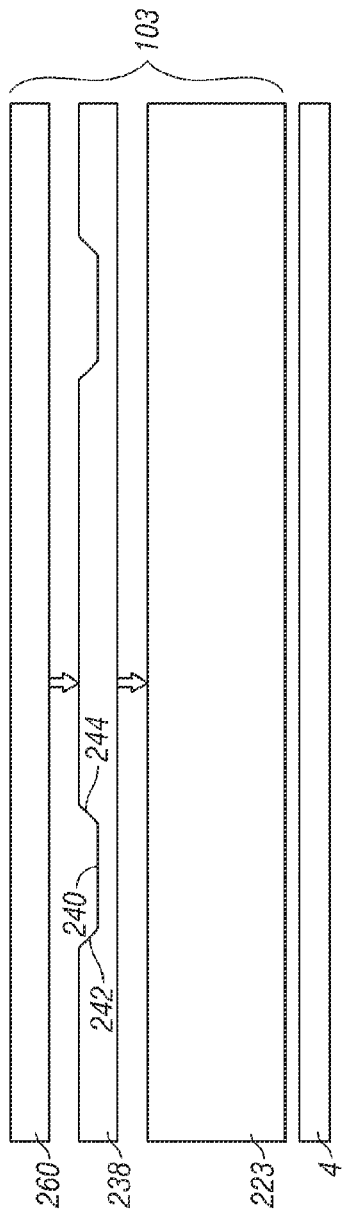
FIG. 14 depicts an alternative embodiment of a front light guide having embedded surface features.
Figure 15:
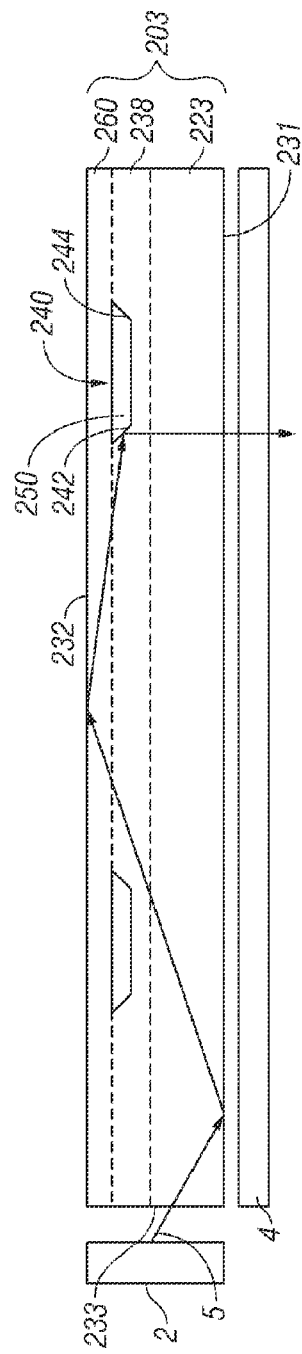
FIG. 15 depicts an alternative embodiment of a frontlit display comprising a reflective display panel, a front light guide panel having embedded surface features and a light source.

Other approaches are also possible. In an alternative embodiment, the turning features embedded in the light guide may be created by a single contoured film laminated to a planar film. For example, as shown in FIGS. 14-15, a light guide 203 may comprise a single contoured film 238 laminated to the top, planar surface of light guide plate 223, such as a plastic or glass light guide. In the embodiment shown, the contour surface of the film 238 is farther from the display panel than the planar surface. Here, the turning facets may be protected by applying a planar plastic cover layer 260 to the contoured surface of film 238. For example, the film 238 may comprise a plastic film, such as acrylic, polycarbonate, ZEONEX® or any other suitable plastic known in the art. The film 238 may be imprinted with a repeating surface relief structure created by embossing, injection molding or any other suitable technologies. The surface relief features 240 may comprise a plurality of facets 242 and 244, which may be either be symmetric or asymmetric. The film 238 may then be attached or laminated to the top surface of a light guide plate 223 such that the embossed film 238 effectively becomes part of the light guide plate 223. Index matching adhesive may be used. The imprinted surface relief features 240 remain as the top, exposed surface of the film 238. A cover layer 260 is then attached or laminated to the exposed surface of the film 238. As discussed above, if the refractive index of both the film 238 and the cover layer 260 are similar, the surface relief features 240 are effectively embedded in the composite (single unitary) light guide 203.

As shown in FIG. 15, cavities (e.g., air pockets) 250, similar to the cavities discussed above, are created between the surface relief features 240 and the cover layer 260. In use, plural light rays 5 from the light source 2 enter the light guide 203 at a light input surface 233 and are guided along the length of the light guide via total internal reflection of the rays at the interface between the light guide 203 and the surrounding air. When a light ray 5 strikes the light guide material/air interface created by one of the embedded cavities 250 at an angle greater than the critical angle for total internal reflection, the light ray 5 will likewise undergo total internal reflection. However, because of the angle of air/light guide material interface created by the facets 242 and 244 of the surface relief features 240, the total internally reflected light is turned through a large angle, usually ninety degrees or greater and may then exit the light guide 203 via the light output face 231 towards the display panel 4.

Figure 16:
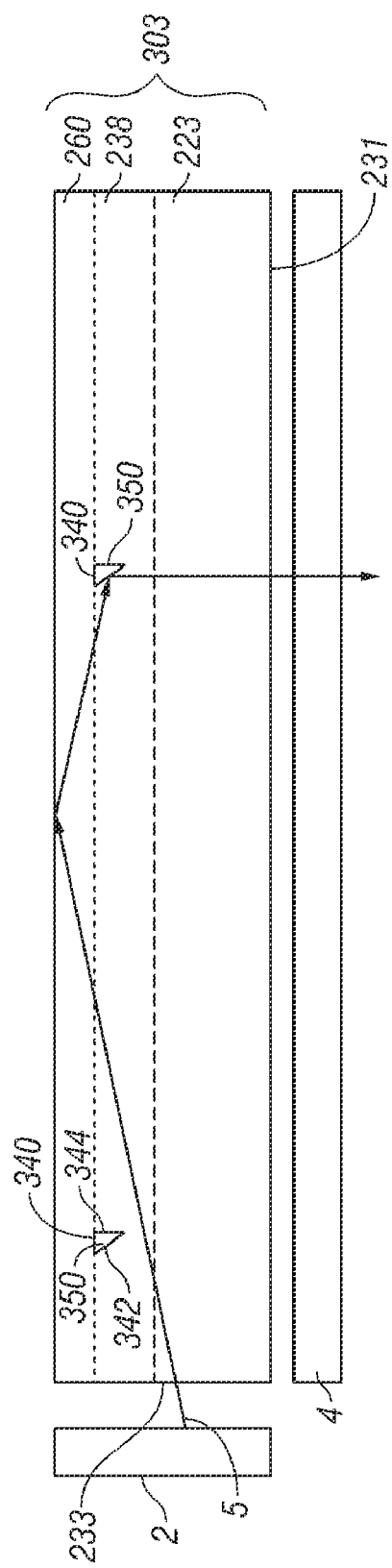
FIG. 16 depicts an alternative embodiment of a front light guide having embedded surface features.

In certain embodiments, such as the cross-sectional view shown in FIG. 16, the surface relief features 340 may be configured such that the cavities (e.g., air pockets) 350 in the light guide 303 have an asymmetrical shape. In particular, as shown, the side closer to the light source 2 is different than the side farther from the light source 2. For example, the steepness of the two facets 342 and 344 is different. In FIG. 16, the surface relief features 340 comprises two adjoining facets 342 and 344 wherein the first facet 342 is a short, steep facet and the second facet 344 is a vertical facet. The asymmetrical shape of the cavities 350 reduces the length of the light guide material/air interface and thereby reduces the detrimental Fresnel reflections that occur when light strikes the interface. The facets may have other angles as well, and may be shaped differently.

Figure 17:
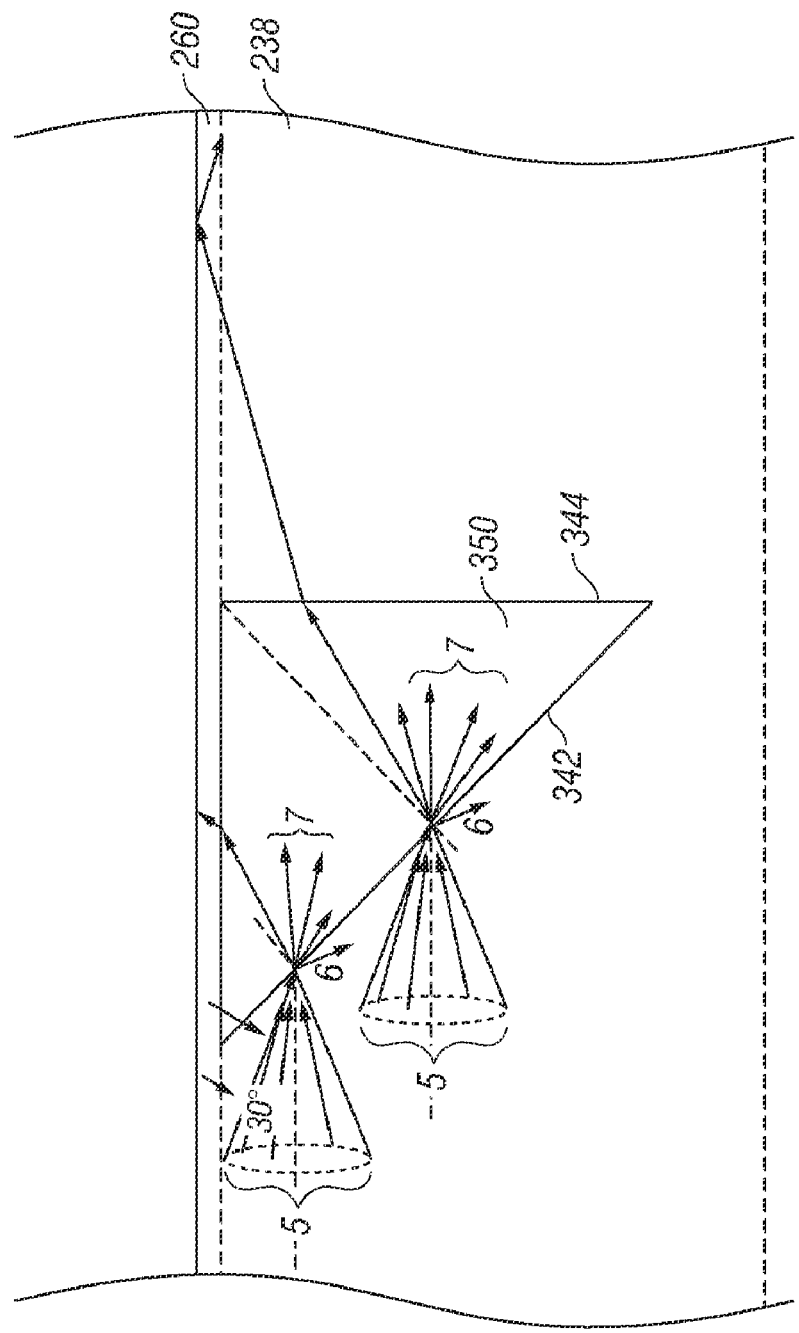
FIG. 17 depicts light rays incident on one of the embedded surface features of the front light guide of FIG. 16.

A further advantage of the embedded surface relief features is that the use of embedded air/light guide material interfaces formed by the cavities 350 more efficiently relays light 5 from a side light source 2. For example, as shown in FIG. 17, when light rays 5 contained within a cone having a half angle of approximately 30° propagate through the light guide 303 and strike the light guide material/air interface at an cavities 350, some of the light 6 is turned down by total internal reflection, as described above, while some of the light 7 is refracted through the interface into the cavities 350. Here, the light 7 may propagate through the cavities 350 until it strikes air/light guide material interface at the vertical facet 344. The light 7 is then refracted at this interface and is thereby quasi-collimated back into the light guide material. If this light then strikes the air/light guide material interface at the surface of the light guide, the light 7 will be totally internally reflected and remain in the light guide. Conversely, if the surface relief features did not comprise a cavity with two embedded light guide-air interfaces, any light not totally internally reflected at the light guide material/air interface of the surface relief feature would be refracted through the interface and escape the light guide. Thus, the efficiency of the light guide is improved by embedding the cavities and providing a second air/light guide material interface to prevent some refracted light from escaping the light guide.

In alternative embodiments, as shown in FIG. 18, the turning facets 242 and 244 may be coated with a reflective coating 280 such as silver or any other suitable metallic coating. The reflective coating 280 may also improve the efficiency of the light guide, by causing any light that would have previously been refracted through the light guide material/air interface instead of being turned via total internal reflection to be reflected downward to the display panel by the reflective coating. In certain embodiments, as discussed above, the cavities 250 may also be filled with a filler material to provide mechanical stability and strength to the structure. In certain embodiments, instead of applying a reflecting coating, the filler material may be reflective.

The turning facets 242 and 244 may be any suitable shape for causing the light to turn over a large angle at the light guide material/air interface created by the surface features 240. In addition, as discussed above, the size, shape, spacing or other characteristics of the facets may be varied to obtain uniform light extraction across the length of the light guide 203. In certain embodiments, as shown in FIG. 19, the surface relief features 240 may comprise a plurality of multifaceted surfaces 442 and 444 instead of the single faceted surfaces 242 and 244 as shown in FIG. 15. The multifaceted surfaces may increase the angular range over which the incident light is turned and thus increase the probability that light turned by adjacent surface features 240, such as shown in FIG. 19, will overlap at the display panel 4, thus improving the uniformity of light incident on the display panel 4. This is especially advantageous when the display panel 4 and the embedded surface relief features 240 are closely spaced such that the distance D over which the turned light rays could spread is small. For example, as shown in FIG. 19, light rays 15 striking the multifaceted turning surface 442 at different heights are turned by total internal reflection over different angles depending upon the angle at which it strikes the turning surface.

Figure 20:
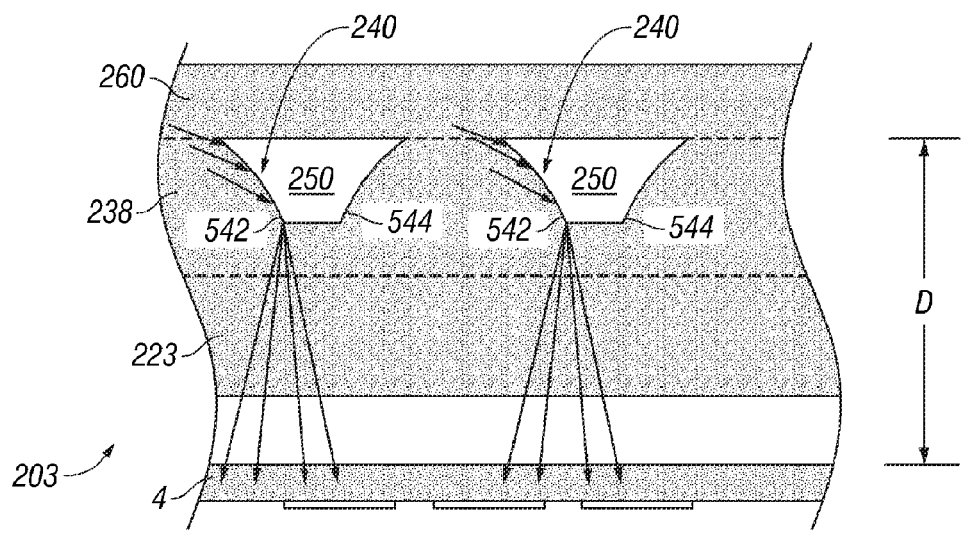
FIG. 20 depicts a detailed view of a portion of an alternative embodiment of a front light guide showing embedded surface features with curved facets.

In an alternative embodiment, as depicted in FIG. 20, the turning surfaces 542 and 544 may alternatively comprise a single curved surface. The curved surfaces 542 and 544 may provide the same advantages as discussed above by varying the interface angle of the air/light guide material interface depending upon the location at which the incident light strikes the turning facet 542 and 544. This in turn increases the angular range over which the light is totally internally reflected and thereby increases the probability that light reflected by adjacent surface features 240 will overlap as it strikes the display panel 4, thus improving the uniformity of the light incident on the display panel 4.

Figure 21:
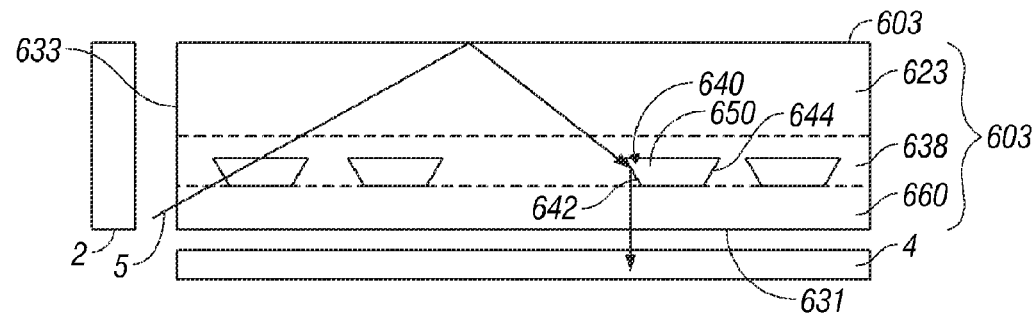
FIG. 21 depicts an alternative embodiment a frontlit display comprising a reflective display panel and a front light guide panel having embedded surface features, wherein the embedded surface features are disposed on a side of a film facing the light guide panel.

In an alternative embodiment, as depicted in FIG. 21, the composite light guide 603 may comprise a film 638 having a first planar surface and a second contoured surface with concave surface relief features 640 extending across the length of a first side of the film and a plastic or glass light guide plate 623 having top and bottom planar surfaces. The film 638 may be attached or laminated to the bottom surface of the light guide plate 623 such that the planar surface of the film 638 is adjacent to the planar bottom surface of the light guide and the film 638 effectively becomes part of the light guide plate 623.

The contoured surface of the film 638 faces away from the light guide plate 623 such that the concave surface relief features 640 remain on the exposed surface of the film 638, also facing away from the light guide plate 623. In certain embodiments, the concave surface features 640 may be protected by applying a planar plastic cover layer 660 to the contoured surface of film 638 to embed the surface features between the film 638 and the cover layer 660. As discussed above, if the refractive index of both the film 638 and the cover layer 660 are similar, the surface relief features 640 are effectively embedded in the composite light guide 603. Alternatively, the concave surface of the film 638 may be attached or laminated directly to the array of display elements such that the concave surface features are embedded between the film 638 and the array of display elements. The concave surface relief features 640 may comprise a plurality of adjacent facets which may be either be symmetric or asymmetric. In the embodiment shown, the concave surface relief features 640 comprise sloping side walls or facets 642 and 644 having the same slope although the slopes can be different in different embodiments. These sloping side walls 642 and 644 are tilted such that the cavity 650 widens with depth into the film 638. Likewise, the edges of each facet 642 and 644 nearest the display elements 4 are closer to each other than the edges of each facet 642 and 644 furthest from the display.

In certain embodiments, as depicted in FIG. 21, the surface relief features 640 may be shaped and sized such that guided light propagating through the light guide 603 will be totally internally reflected at the air/light guide material interface. In use, plural light rays 5 from the light source 2 enter the light guide 603 at a light input surface 633 and are guided along the length of the light guide via total internal reflection of the rays at the interface between the light guide 603 and the surrounding air. When a light ray 5 strikes the air/light guide material interface created by one of the embedded cavities (e.g., air pockets) 650 at an angle greater than the critical angle for total internal reflection, the light ray 5 will undergo total internal reflection at the facet 642. Because of the angle of air/light guide material interface created by the facets 642 and 644 of the surface relief features 640, the total internally reflected light is turned through a large angle, usually ninety degrees or greater (relative to the light output face 631) and may then exit the light guide 603 via the light output face 631 towards the array of display elements 4.

Figure 22:
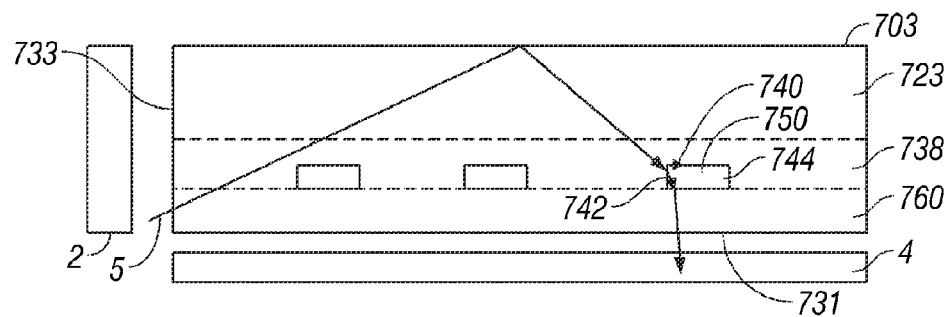
FIG. 22 depicts an alternative embodiment of a frontlit display similar to that of FIG. 21 wherein the embedded surface features have vertical walls.

In alternative embodiments, as depicted in FIG. 22, the surface relief features 740 may be shaped and sized such that guided light propagating through the light guide 703 will be turned towards the array of display elements by refraction of the light rays at the air/light guide material interface. Cavities (e.g., air pockets) 750, similar to the cavities discussed above, are created between the surface relief features 740 and the cover layer 760. In the embodiment shown, the surface relief features 740 comprise vertical sidewalls or facets 742 and 744, although the shapes may be different in different embodiments.

In use, light rays 5 from the light source 2 enter the light guide 703 at a light input surface 733 and are guided along the length of the light guide via total internal reflection of the rays at the interface between the light guide 503 and the surrounding air. When a light ray 5 strikes the air/light guide material interface created by one of the embedded cavities 750, the light ray 5 will be refracted due to the change in refractive index between the light guide and air. Because of the angle of air/light guide material interface created by the facet 742 of the surface relief features 740, the light will be bent such that it exits the light guide 703 via the light output face 731 and is directed towards the array of display elements 4.

A wide variety of other variations are also possible. Structural features may be added, removed, reordered, or rearranged. Different structural features may be substituted out. The type, arrangement, and configuration of the components may be different. Components may be added or removed. Similarly, processing steps may be added or removed, or reordered. Also, although some embodiments are described as plates, these embodiments may otherwise comprise films or sheets. Additionally, the terms film and layer as used herein include film stacks and multilayers. While these embodiments are discussed in the context of an interferometric display, one of skill in the art will recognize that the technology is applicable in any directed-lighting solution including room lighting and display lighting for any of reflective, transmissive and transflective technologies.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention is indicated by the appended claims rather than by the foregoing description. All changes which come within the meaning and range of equivalency of the claims are to be embraced within their scope.

What is claimed is:

1. A light guide system comprising:
a cover layer; and
a light guide body comprising a plurality of surface relief features extending into the light guide body, the surface relief features comprising a plurality of angled facets, wherein, in a cross-sectional side view, the plurality of angled facets comprises at least two facets coated with a reflective coating at opposing sides of the surface relief features;
wherein the cover layer and light guide body are configured to guide light therein, and wherein the cover layer is disposed adjacent to the plurality of the surface relief features such that a plurality of cavities are formed between the cover layer and the light guide body by a substantially planar surface of the cover layer and substantially all the surface relief features disposed between the cover layer and the light guide body,
wherein, in a cross-sectional side view, each surface relief feature is substantially symmetric about an axis perpendicular to the planar surface of the cover layer,
wherein the light guide body is thicker than the cover layer, and
wherein each angled facet is substantially non-perpendicular to the planar surface of the cover layer.

2. The light guide system of claim 1, wherein the light guide body comprises first and second layers bonded together.

3. The light guide system of claim 2, wherein the first and second layers of the light guide body comprise at least one of acrylic or polycarbonate.

4. The light guide system of claim 1, wherein the cover layer and light guide body have the same index of refraction.

5. The light guide system of claim 1, wherein the cavities are configured to totally internally reflect the light such that the light is no longer guided within the cover layer or light guide body.

6. The light guide system of claim 1, wherein the cavities comprise air pockets.

7. The light guide system of claim 1, wherein the cavities are filled with a filler material.

8. The light guide system of claim 7, wherein the filler material is reflective.

9. The light guide system of claim 1, wherein the cover layer is disposed over an array of display elements, the cover layer being closer to the display elements than the light guide body.

10. The light guide system of claim 1, wherein the one or more surface relief features comprise elongate microprisms.

11. The light guide system of claim 10, wherein the microprisms comprise adjacent sides that are multifaceted.

12. The light guide system of claim 1, wherein the one or more surface relief features comprise at least two adjacent facets angled with respect to one another.

13. The light guide system of claim 12, wherein the at least two adjacent facets have different angles of inclination with respect to one another.

14. The light guide system of claim 12, wherein the at least two adjacent facets comprise curved surfaces.

15. The light guide system of claim 1, wherein the one or more surface relief features comprises two vertical facets.

16. The light guide system of claim 1, wherein the one or more surface relief features have a reflective coating thereon.

17. The light guide system of claim 1, wherein the light guide body includes an edge through which light can be injected, the injected light being scattered out of the light guide body at the cavities.

18. The light guide system of claim 17, wherein the one or more surface relief features comprise at least two adjacent facets angled with respect to one another such that light injected through the edges is refracted at the cavities.

19. The light guide system of claim 17, wherein the one or more surface relief features comprise at least two adjacent facets angled with respect to one another such that light injected through the edges is turned via total internal reflection at the cavities.

20. The light guide system of claim 1, the cover layer further comprising:
a viewing face positioned opposite the planar surface.

21. The light guide system of claim 20, wherein the viewing face is planar.

22. The light guide system of claim 1, wherein the plurality of surface relief features are configured to redirect light injected into the light guide body in a direction opposite the planar surface of the cover layer.

23. The light guide system of claim 22, further comprising an array of reflective display elements disposed adjacent the light guide body opposite the cover layer.

24. A light guide system comprising:
means for guiding light comprising a plurality of means for redirecting light, the light redirecting means comprising a plurality of angled facets, wherein, in a cross-sectional side view, the plurality of angled facets comprises at least two facets coated with a reflective coating at opposing sides of the light redirecting means;
means for covering the light redirecting means;
means for displaying images, the displaying images means disposed under the light guiding means,
wherein the covering means and light guiding means are configured to guide light therein, and wherein the covering means is disposed adjacent to the plurality of light redirection means such that a plurality of cavities are formed between the covering means and the light guiding means by a substantially planar surface of the covering means and substantially all of the light redirection means disposed between the covering means and the light guiding means, wherein, in a cross-sectional side view, each light redirecting means is substantially symmetric about an axis perpendicular to the planar surface of the covering means, wherein the light guiding means is thicker than the covering means, and wherein each angled facet is substantially non-perpendicular to the planar surface of the covering means.

25. The light guide system of claim 24, wherein the covering means is disposed over the displaying images means, the covering means being closer to the displaying images means than the light guiding means.

26. The light guide system of claim 24, wherein the covering means comprises a cover layer, the light guiding means comprises a light guide body, the displaying images means comprises a plurality of display elements, and the light redirecting means comprises surface relief features.

27. The light guide system of claim 26, wherein the plurality of display elements comprise interferometric modulators.

* * * * *